United States Patent [19]
Denzel et al.

[11] 3,880,867
[45] Apr. 29, 1975

[54] DERIVATIVES OF FURO(2,3-D)PYRAZOLO(3,4-B)PYRIDINES

[75] Inventors: Theodor Denzel, Regensburg; Hans Hoehn, Tegernheim, both of Germany

[73] Assignee: E. R. Squibb & Sons, Inc., Princeton, N.J.

[22] Filed: Feb. 5, 1974

[21] Appl. No.: 439,777

[52] U.S. Cl.................... 260/295 T; 260/295.5 T
[51] Int. Cl............................................. C07d 99/04
[58] Field of Search................... 260/295 T, 295 ST

[56] References Cited
UNITED STATES PATENTS
| | | | |
|---|---|---|---|
| 3,669,950 | 6/1972 | Hoehn et al.................. | 260/295.5 T |
| 3,697,532 | 10/1972 | Hoehn et al.................. | 260/295.5 T |
| 3,787,430 | 1/1974 | Hoehn et al.................. | 260/295.5 T |

OTHER PUBLICATIONS
Chemical Abstracts, Jan.–June 1973, Chem. Substance Index, p. 1787es.

*Primary Examiner*—Albert T. Meyers
*Assistant Examiner*—Norman A. Drezin
*Attorney, Agent, or Firm*—Lawrence S. Levinson; Merle J. Smith

[57] ABSTRACT

New derivatives of furo[2,3-d]pyrazolo[3,4-b]pyridines have the general formula

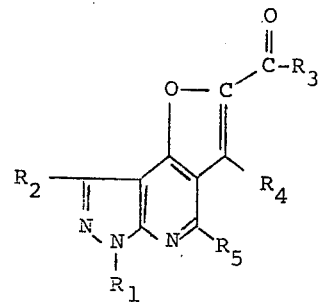

They are useful as antiinflammatory agents and central nervous system depressants. In addition, this type of compound increases the intra-cellular concentration of adenosine-3', 5'-cyclic monophosphate.

13 Claims, No Drawings

DERIVATIVES OF FURO(2,3-D)PYRAZOLO(3,4-B)PYRIDINES

SUMMARY OF THE INVENTION

This invention is related to new derivatives of furo[2,3-d]pyrazolo[3,4-b]pyridines. These new compounds have the general formula (I)

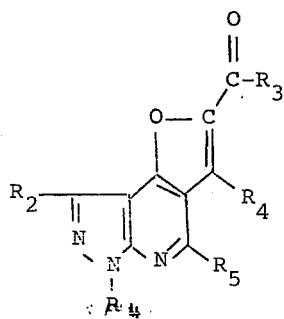

The symbols have the following meanings in formula I and throughout this specification.

$R_1$ is hydrogen, lower alkyl or phenyl-lower alkyl. $R_2$ is hydrogen or lower alkyl. $R_3$ is lower alkyl, phenyl, hydroxy or lower alkoxy. $R_4$ is hydroxy, lower alkoxy or an acyclic basic nitrogen group

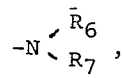

wherein $R_6$ and $R_7$ each is hydrogen, lower alkyl or phenyl-lower alkyl. $R_5$ is hydrogen, lower alkyl or phenyl.

The lower alkyl groups referred to throughout this specification include straight or branched chain hydrocarbon groups containing 1 to 7 carbon atoms. Examples of the groups contemplated are methyl, ethyl, propyl, isopropyl, etc. Preferred are the one to four carbon members and especially the $C_1$—$C_2$ members.

Preferred embodiments of this invention are as follows:

$R_1$ is hydrogen, lower alkyl, especially methyl or ethyl, and phenyl-($C_1$—$C_2$) lower alkyl.

$R_2$ is hydrogen or lower alkyl, especially $C_1$—$C_2$ lower alkyl and most especially hydrogen.

$R_3$ is hydroxy, lower alkoxy, lower alkyl, phenyl, especially lower alkoxy and phenyl, the $C_1$—$C_4$ lower alkoxy being most preferred.

$R_4$ is hydroxy, lower alkoxy, lower alkylamino or di-(lower alkyl)amino, especially wherein the lower alkyl groups are $C_1$—$C_3$ alkyl.

$R_5$ is methyl or hydrogen, especially hydrogen.

The group

is lower alkylamino, especially butylamino.

The new compounds of formula I are produced from starting materials of the formula (produced as described in U.S. Pat. No. 3,773,777, Nov. 20, 1973)

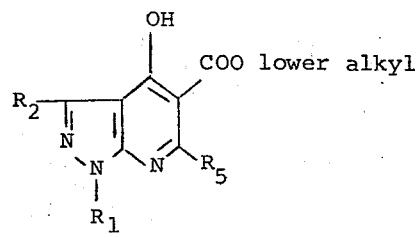

The compound of formula II is treated with an α-halogen compound of the formula (III)

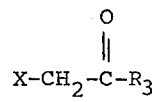

wherein X is preferably chlorine or bromine, producing a compound of the formula (IV)

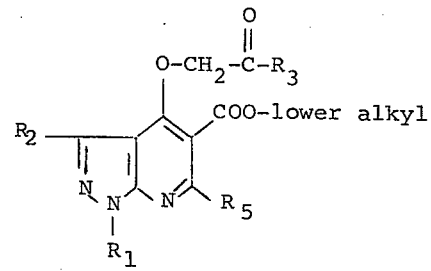

Compounds of formula I wherein $R_4$ is hydroxy, i.e., (Ia)

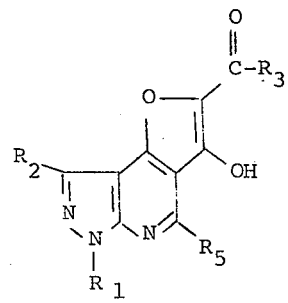

are produced by reacting a compound of formula IV with a base like an alkali metal carbonate or alkali metal alcoholate, e.g., sodium or potassium carbonate or sodium or potassium methoxide or ethoxide.

Compounds of formula I wherein $R_4$ is lower alkoxy, i.e., (Ib)

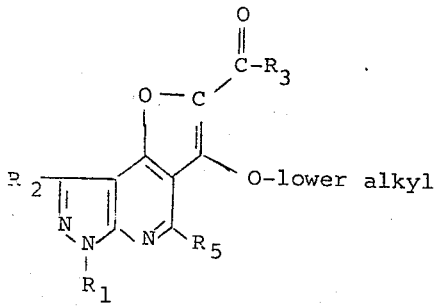

are produced by reaction of a compound of formula Ia with a lower alkyl halide like methyl or ethyl iodide, or aralkyl halide, in the presence of a metal carbonate, e.g., an alkali metal carbonate like potassium carbonate.

Compounds of formula I wherein $R_4$ is lower alkylamino or di-lower alkylamino, i.e., (Ic)

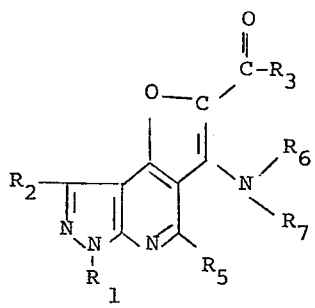

are formed by reaction of a compound of formula Ib with the appropriate amine of the formula (V)

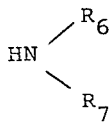

Sometimes it is necessary to utilize an autoclave.

Compounds of formula I wherein $R_1$ is hydrogen are produced by the method described in the above cited patent utilizing a starting material with a heteromethyl group like furfuryl, pyridylmethyl, pyrimidylmethyl or the like in the 1-position. This material is processed as described above until a product of formula I is obtained with the heteromethyl group still in the 1-position This product is then oxidized with an oxidizing agent like selenium dioxide in a high boiling solvent like diethyleneglycol dimethyl ether at about 160°C., yielding a compound of formula I with hydrogen in the 1-position of the molecule.

When $R_4$ in formula I is hydroxy (as in formula Ia above), the compounds can exist as enol-keto tautomers. Alkylation of this product as described above for formation of products of formula Ib can result also in tautomers in the keto form as illustrated in Example 1c below. Therefore compounds in the keto form are included within the scope of the invention described.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I or physiologically acceptable salt thereof may be administered orally or parenterally in a conventional dosage form such as tablet, capsule, injectable or the like. A single dose, or preferably two to four divided daily doses, provided on a basis of about 2 to 40 mg. per kilogram per day, preferably about 5 to 30 mg. per kilogram per day, is appropriate.

These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3′,5′-cyclic monophosphate, and thus by the administration of about 1 to 100 mg./kg./day, preferably about 10 to 50 mg./kg., in single or two to four divided doses in conventional oral or parenteral dosage forms such as those described above may be used to alleviate the symptoms of asthma.

The new compounds of this invention also have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg/kg/day, preferably 10 to 25 mg./kg./day, in single or 2 to 4 divided doses, as indicated by the carageenan edema assay in rats. The active substance may be utilized in compositions such as tablets, capsules, solutions or suspensions containing up to about 300 mg./per unit of dosage of a compound or mixture of compounds of formula I. They may be compounded in conventional manner as described above.

The following examples are illustrative. All temperatures are on the centigrade scale.

EXAMPLE 1

3-Ethoxy-6-ethyl-6H-furo[2,3-d]pyrazolo[3,4-b]pyridine-2-carboxylic acid ethyl ester a. 1-Ethyl-4-(ethoxycarbonylmethoxy)-1H-pyrazolo[3,4-b]-pyridine-5-carboxylic acid ethyl ester 23.5 g. of 1-Ethyl-4-hydroxy-1H-pyrazolo[3,4-b]pyridine-5-carboxylic acid ethyl ester (0.1 mol.) are dissolved in 100 ml. of dimethylformamide. 21 g. of potassium carbonate and 16.7 g. bromoacetic acid, ethyl ester, are added. The mixture is heated to 70° and stirred at that temperature for 10 hours. Then the inorganic precipitate is filtered off and the filtrate acidified with acetic acid. After addition of 50 ml. of water, 1-ethyl-4-(ethoxycarbonylmethoxy)-1H-pyrazolo[3,4-b]pyridine-5-carboxylic acid, ethyl ester, precipitates and is filtered off and recrystallized from butyl alcohol, m.p., 92°–94°, yield 21.1 g. (66%).

b. 6-Ethyl-3-hydroxy-6H-furo[2,3-d]pyrazolo[3,4-b]pyridine-2-carboxylic acid ethyl ester 16 g. of 1-ethyl-4-(ethoxy carbonylmethoxy)-1H-pyrazolo[3,4-b]pyridine-5-carboxylic acid, ethyl ester, (0.05 mol.) are dissolved in 100 ml. anhydrous dioxane. 1.2 g. of sodium hydride are added and the mixture is refluxed for 6 hours. After this time, the solution is acidified with acetic acid and evaporated to dryness. From the resulting oil, 6-ethyl-3-hydroxy-6H-furo[2,3-d]pyrazolo[3,4-b]pyridine-2-carboxylic acid, ethyl ester, is extracted with about 200 ml. of methanol. The insoluble products are filtered off and the product crystallizes on cooling, m.p. 172°–174°. Yield 8.5 g. (62%).

c. 3-Ethoxy-6-ethyl-6H-furo[2,3-d]pyrazolo[3,4-b]pyridine-2-carboxylic acid ethyl ester and 2,6-Diethyl-3,6-dihydro-3-oxo-2H-furo[2,3-d]pyrazolo[3,4-b]pyridine-2-carboxylic acid ethyl ester 2.8 g. of 6-ethyl-3-hydroxy-6H-furo[2,3-d]pyrazolo[3,4-b]pyridine-2-carboxylic acid ethyl ester (0.01 mol.) are dissolved in about 20 ml. of dimethylformamide and heated for 10 hours at 60° together with 2.8 g. of potassium carbonate and 3.7 g. of ethyl iodide. The inorganic precipitate is now filtered off and a mixture of the products crystallize upon addition of about 10 ml. of water. Recrystallization from ethanol yields 1.2 g. of 3-ethoxy-6-ethyl-6H-furo[2,3-d]pyrazolo[3,4-b]pyridine-2-carboxylic acid, ethyl ester (40%), m.p. 126°-127°C. Evaporation of the mother liquor provides 1.1 g. of 2,6-diethyl-3,6-dihydro-3-oxo-2H-furo[2,3-d]pyrazolo[3,4-b]pyridine-2-carboxylic acid ethyl ester (36%), m.p. 80°-82°C.

The following additional compounds are produced by the foregoing procedure by substituting the appropriately substituted analog for the 1-ethyl-4-hydroxy-1H-pyrazolo[3,4-b]pyridine-5-carboxylic acid ethyl ester in part a and for the ethyl iodide in part c:

6-isopropyl-3-hydroxy-6H-furo[2,3-d]pyrazolo[3,4-b]pyridine-2-carboxylic acid ethyl ester.

6-isopropyl-3-methoxy-6H-furo[2,3-d]pyrazolo[3,4-b]pyridine-2-carboxylic acid ethyl ester.

6-benzyl-3-hydroxy-6H-furo[2,3-d]pyrazolo[3,4-b]pyridine-2-carboxylic acid n-propyl ester.

6-benzyl-3-ethoxy-6H-furo[2,3-d]pyrazolo[3,4-b]pyridine-2-carboxylic acid n-propyl ester.

6,8-dimethyl-3-hydroxy-6H-furo[2,3-d]pyrazolo[3,4-b]pyridine2-carboxylic acid methyl ester. 6,8-dimethyl-3-methoxy-6H-furo[2,3-d]pyrazolo[3,4-b]pyridine-2-carboxylic acid.

4,6-dimethyl-3-hydroxy-6H-furo[2,3-d]pyrazolo[3,4-b]pyridine-2-carboxylic acid butyl ester.

4,6-dimethyl-3-propoxy-6H-furo[2,3-d]pyrazolo[3,4-b]pyridine-2-carboxylic acid butyl ester.

3-hydroxy-6-phenethyl-6H-furo[2,3-d]pyrazolo[3,4-b]pyridine-2-carboxylic acid methyl ester.

3-methoxy-6-phenethyl-6H-furo[2,3-d]pyrazolo[3,4-b]pyridine-2-carboxylic acid methyl ester.

4,6-diethyl-3-hydroxy-6H-furo[2,3-d]pyrazolo[3,4-b]pyridine-2-carboxylic acid ethyl ester.

4,6-diethyl-3-ethoxy-6H-furo[2,3-d]pyrazolo[3,4-b]pyridine-2-carboxylic acid ethyl ester.

EXAMPLE 2

3-Ethoxy-6H-furo[2,3-d]pyrazolo[3,4-b]pyridine-2-carboxylic acid ethyl ester a. 3-Ethoxy-6-(2-furyl)methyl-6H-furo[2,3-d]pyrazolo[3,4-b]pyridine-2-carboxylic acid ethyl ester 4-Hydroxy-1-(2-furyl)methyl-1H-pyrazolo[3,4-b]pyridine-5-carboxylic acid ethyl ester is substituted for the 1-ethyl-4-hydroxy-1H-pyrazolo[3,4-b]pyridine-5-carboxylic acid ethyl ester in Example 1a and processed as in parts b and c to obtain 3-ethoxy-6-(2-furyl)methyl-6H-furo[2,3-d]pyrazolo[3,4-b]pyridine-2-carboxylic acid ethyl ester.

b. 3-Ethoxy-6H-furo[2,3-d]pyrazolo[3,4-b]pyridine-2-carboxylic acid ethyl ester

The product of part a (0.1 mol.) and 20 g. of selenium dioxide (0.18 mol.) are suspended in 100 ml. of diethyleneglycol dimethylether and heated with stirring at 160° for 1.5 hours. The product is cooled and crystallized from water to obtain 3-ethoxy-6H-furo[2,3-d]pyrazolo[3,4-b]pyridine-2-carboxylic acid ethyl ester.

The following additional compounds are produced by the foregoing procedure by substituting the appropriately substituted analog for the 4-hydroxy-1-(2-furyl)methyl-1H-pyrazolo[3,4-b]pyridine-5-carboxylic acid ethyl ester.

3-ethoxy-8-methyl-6H-furo[2,3-d]pyrazolo[3,4-b]pyridine-2-carboxylic acid ethyl ester.

3-ethoxy-4-methyl-6H-furo[2,3-d]pyrazolo[3,4-b]pyridine-2-carboxylic acid ethyl ester.

3-ethoxy-4-phenyl-6H-furo[2,3-d]pyrazolo[3,4-b]pyridine-2-carboxylic acid ethyl ester.

EXAMPLE 3

2-Benzoyl-6-ethyl-3-ethoxy-6H-furo[2,3-d]pyrazolo[3,4-b]pyridine a. 1Ethyl-4-phenacyloxy-1H-pyrazolo[3,4-b]pyridine-5-carboxylic acid ethyl ester 35.3 g. of 1-Ethyl-4-hydroxy-1H-pyrazolo[3,4-b]pyridine-5-carboxylic acid ethyl ester (0.1 mol.) are dissolved in 100 ml. of dimethylformamide. 21 g. of potassium carbonate and 19.9 g. of bromoacetophenone are added and the mixture is heated to 50° for 5 hours. After this time, the inorganic precipitate is filtered off. 1-Ethyl-4-phenacyloxy-1H-pyrazolo[3,4-b]pyridine-5-carboxylic acid ethyl ester crystallizes after the addition of a few ml. of water, m.p. 95°-96°, yield 28.7 g. (82%).

b. 2-Benzoyl-6-ethyl-3-hydroxy-6H-furo[2,3-d]pyrazolo[3,4-b]pyridine 3.5 g. of 1-ethyl-4-phenacyloxy-1H-pyrazolo[3,4-b]pyridine-5-carboxylic acid ethyl ester (0.01 mol.) is refluxed in 30 ml. of anhydrous dioxane with 0.3 g. of sodium hydride for 8 hours. The solution is acidified with acetic acid and evaporated to dryness. Extraction of the resulting oil with hot ethyl alcohol yields, on cooling 2.0 g. of 2-benzoyl-6-ethyl-3-hydroxy-furo[2,3-d]pyrazolo[3,4-b]pyridine (65%), m.p. 161°-163° (methanol).

c. 2-Benzoyl-3-ethoxy-6-ethyl-6H-furo[2,3-d]pyrazolo[3,4-b]pyridine 3.1 g. of 2-benzoyl-6-ethyl-3-ethoxy-6H-furo[2,3-d]pyrazolo[3,4-b]pyridine (0.01 mol.), 2.8 g. of potassium carbonate and 3.7 g. of ethyl iodide are heated together in 50 ml. of dimethylformamide with stirring at about 60° for 10 hours. The inorganic precipitate is filtered off and 2-benzoyl-6-ethyl-3-ethoxy-6H-furo[2,3-d]pyrazolo[3,4-b]pyridine crystallizes on addition of about 10 ml. of water. Yield 2.5 g. (73%), m.p. 98°-101° (methanol).

The following additional compounds are produced by the foregoing procedure by substituting the appropriately substituted analog for the 1-ethyl-4-hydroxy-1H-pyrazolo[3,4-b]pyridine-5-carboxylic acid ethyl ester and for the bromoacetophenone:

2-acetyl-6-methyl-3-hydroxy-6H-furo[2,3-d]pyrazolo[3,4-b]pyridine.

2-acetyl-6-methyl-3-propoxy-6H-furo[2,3-d]pyrazolo[3,4-b]pyridine.

2-butyryl-6,8-dimethyl-3-hydroxy-6H-furo[2,3-d]pyrazolo[3,4-b]pyridine.

2-butyryl-6,8-dimethyl-3-ethoxy-6H-furo[2,3-d]pyrazolo[3,4-b]pyridine. 2-benzoyl-6-ethyl-3-hydroxy-4-methyl-6H-furo[2,3-d]-pyrazolo[3,4-b]pyridine.

2-benzoyl-6-ethyl-3-ethoxy-4-methyl-6H-furo[2,3-d]pyrazolo[3,4-b]pyridine.

2-benzoyl-3-hydroxy-4,6,8-trimethyl-6H-furo[2,3-d]pyrazolo[3,4-b]pyridine.

2-benzoyl-3-methoxy-4,6,8-trimethyl-6H-furo[2,3-d]pyrazolo[3,4-b]pyridine.

2-benzoyl-3-hydroxy-6H-furo[2,3-d]pyrazolo[3,4-b]pyridine.

2-benzoyl-3-propoxy-6H-furo[2,3-d]pyrazolo[3,4-b]pyridine.

EXAMPLE 4

3-(Butylamino)-6-ethyl-6H-furo[2,3-d]pyrazolo[3,4-b]pyridine-2-carboxylic acid ethyl ester 30.3 g. of 6-ethyl-3-ethoxy-6H-furo[2,3-d]pyrazolo[3,4-b]pyridine-2carboxylic acid ethyl ester (0.1 mol.) and 100 ml. of n-butylamine are heated in an autoclave at 150° for 10 hours. After this time, the excess butylamine is distilled off and the crystalline residue, 3-(butylamino)-6-ethyl-6H-furo[2,3-d]pyrazolo[3,4-b]pyridine-2-carboxylic acid ethyl ester is recrystallized from methanol, m.p. 155°–158°, yield 2.4 g. (73%).

The following additional compounds are produced by the foregoing procedure by substituting a product of Example 1, 2 or 3 for the 6-ethyl-3-ethoxy-6H-furo[2,3-d]pyrazolo[3,4-b]pyridine-2-carboxylic acid ethyl ester and the appropriately substituted alkylamine for the n-butylamine:

6-isopropyl-3-(methylamino)-6H-furo[2,3-d]pyrazolo[3,4-b]pyridine-2-carboxylic acid ethyl ester.

6-benzyl-3-(ethylamino)-6H-furo[2,3-d]pyrazolo[3,4-b]pyridine-2-carboxylic acid n-propyl ester. 6-benzyl-3-amino-6H-furo[2,3-d]pyrazolo[3,4-b]pyridine-3-carboxylic acid n-propyl ester.

6,8-dimethyl-3-(diethylamino)-6H-furo[2,3-d]pyrazolo[3,4-b]pyridine-2-carboxylic acid methyl ester.

6,8-dimethyl-3-n-butylamino-6H-furo[2,3-d]pyrazolo[3,4-b]pyridine-2-carboxylic acid.

4,6-dimethyl-3-n-butylamino-6H-furo[2,3-d]pyrazolo[3,4-b]pyridine-2-carboxylic acid butyl ester.

4,6-dimethyl-3-benzylamino-6H-furo[2,3-d]pyrazolo[3,4-b]pyridine-2-carboxylic acid butyl ester.

6-ethyl-3-(phenethylamino)-6H-furo[2,3-d]pyrazolo[3,4-b]pyridine-2-carboxylic acid ethyl ester.

3-butylamino-6H-furo[2,3-d]pyrazolo[3,4-b]pyridine-2-carboxylic acid ethyl ester.

3-dimethylamino-8-methyl-6H-furo[2,3-d]pyrazolo[3,4-b]pyridine-2-carboxylic acid ethyl ester.

3-ethylamino-4-methyl-6H-furo[2,3-d]pyrazolo[3,4-b]pyridine-2-carboxylic acid ethyl ester.

3-diethylamino-4-phenyl-6H-furo[2,3-d]pyrazolo[3,4-b]pyridine-2-carboxylic acid ethyl ester.

2-acetyl-6-methyl-3-(n-butylamino)-6H-furo[2,3-d]pyrazolo[3,4-b]pyridine.

2-acetyl-6-methyl-3-(dimethylamino)-6H-furo[2,3-d]pyrazolo[3,4-b]pyridine.

2-butyryl-6,8-dimethyl-3-(dibutylamino)-6H-furo[2,3-d]pyrazolo[3,4-b]pyridine.

2-butyryl-6,8-dimethyl-3-(diethylamino)-6H-furo[2,3-d]pyrazolo[3,4-b]pyridine.

2-benzoyl-6-ethyl-3-(methylamino)-4-methyl-6H-furo[2,3-d]pyrazolo[3,4-b]pyridine.

2-benzoyl-6-ethyl-3-(benzylamino)-4-methyl-6H-furo[2,3-d]pyrazolo[3,4-b]pyridine.

2-benzoyl-3-ethylamino-4,6,8-trimethyl-6H-furo[2,3-d]pyrazolo[3,4-b]pyridine.

2-benzoyl-3-(diethylamino)-4,6,8-trimethyl-6H-furo[2,3-d]pyrazolo[3,4-b]pyridine.

2-benzoyl-3-(dibenzylamino)-6H-furo[2,3-d]pyrazolo[3,4-b]pyridine.

2-benzoyl-3-(n-butylamino)-6H-furo[2,3-d]pyrazolo[3,4-b]pyridine.

What is claimed is:

1. A compound of the formula

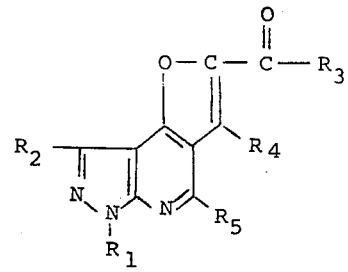

wherein $R_1$ is hydrogen, lower alkyl or phenyl-lower alkyl; $R_2$ is hydrogen or lower alkyl; $R_3$ is lower alkyl, phenyl, hydroxy or lower alkoxy; $R_4$ is hydroxy, lower alkoxy or

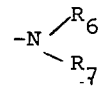

wherein $R_6$ and $R_7$ each is hydrogen, lower alkyl or phenyl-lower alkyl; and $R_5$ is hydrogen, lower alkyl or phenyl.

2. A compound as in claim 1 wherein $R_1$ is hydrogen, lower alkyl or phenyl-lower alkyl, $R_2$ is hydrogen or lower alkyl, $R_3$ is hydroxy, lower alkoxy, lower alkyl or phenyl, $R_4$ is hydroxy, lower alkoxy, lower alkylamino or di(lower alkyl)amino and $R_5$ is methyl or hydrogen.

3. A compound as in claim 1 wherein $R_2$ and $R_5$ each is hydrogen.

4. A compound as in claim 1 wherein $R_1$ is lower alkyl, $R_3$ and $R_4$ each is lower alkoxy and $R_2$ and $R_5$ each is hydrogen.

5. A compound as in claim 1 wherein $R_1$ is lower alkyl, $R_3$ is lower alkoxy, $R_4$ is hydroxy and $R_2$ and $R_5$ each is hydrogen.

6. A compound as in claim 1 wherein $R_1$ is lower alkyl, $R_3$ is phenyl, $R_4$ is hydroxy and $R_2$ and $R_5$ each is hydrogen.

7. A compound as in claim 1 wherein $R_1$ is lower alkyl, $R_3$ is phenyl, $R_4$ is lower alkoxy and $R_2$ and $R_5$ each is hydrogen.

8. A compound as in claim 1 wherein $R_1$ is lower alkyl, $R_3$ is lower alkoxy, $R_4$ is lower alkylamino and $R_2$ and $R_5$ each is hydrogen.

9. A compound as in claim 4 wherein the lower alkyl group is ethyl and each lower alkoxy group is ethoxy.

10. A compound as in claim 5 wherein the lower alkyl group is ethyl and the lower alkoxy group is ethoxy.

11. A compound as in claim 6 wherein the lower alkyl group is ethyl.

12. A compound as in claim 7 wherein the lower alkyl group is ethyl and the lower alkoxy group is ethoxy.

13. A compound as in claim 8 wherein, the lower alkyl group is ethyl, the lower alkoxy group is ethoxy and the lower alkylamino group is butylamino.

* * * * *